United States Patent Office 3,305,498
Patented Feb. 21, 1967

3,305,498
PROCESS FOR MAKING PARTICLE-POLYMER COMPOSITIONS
Daniel F. Herman, Princeton, Albert L. Resnick, Metuchen, and Dominic Simone, New Brunswick, N.J., assignors to National Lead Company, New York, N.Y., a corporation of New Jersey
Filed Feb. 18, 1963, Ser. No. 259,449
9 Claims. (Cl. 260—8)

This invention relates to a process for polymerizing vinyl monomers directly onto the surfaces of finely divided particulate substrates, to the products obtained thereby, to processes for forming useful articles from such products and to the products resulting from such forming operations.

More particularly, this invention is concerned with a simple, inexpensive process for forming vinyl polymers such as polystyrene, polymethacrylates, polyacrylates, polyacrylonitrile, polyvinyl chloride, and the like, directly onto finely divided, particulate substrates, such as cellulose, wool, asbestos, silica, and the like, where each individual particle of the substrate is substantially encased in a shell of the polymer that is chemically or physically bonded thereto. This invention is also concerned with the polymer coated substrate thus prepared and with the polymer product remaining after the substrate has been removed.

An object of this invention is to provide a process whereby small particles of substrate material may be easily and inexpensively encased in individual casings of vinyl polymer anchored to the particles.

Another object of this invention is to provide a process for substantially encapsulating finely divided, particulate substrates with up to 80% by total weight of vinyl polymers, such as polystyrene, polyvinyl chloride, polymethacrylates, polyacrylates, and polyacrylonitrile, and the like.

A further object of this invention is to provide a process for substantially encapsulating particles with vinyl polymers selectively shaped as beads or replicas.

A still further object of this invention is to provide a product consisting of finely divided particles, each substantially encased in a capsule of a vinyl polymer, which product is free flowing, easily formable into sheets, films, tubes or articles having a wide variety of shapes and capable of many different uses and applications.

Yet another object of this invention is to provide a product consisting of particles of vinyl polymers selectively shaped as beads or replicas.

Other objects will be apparent to those skilled in the art from reading the following description taken in conjunction with the drawings in which.

Figure 1:
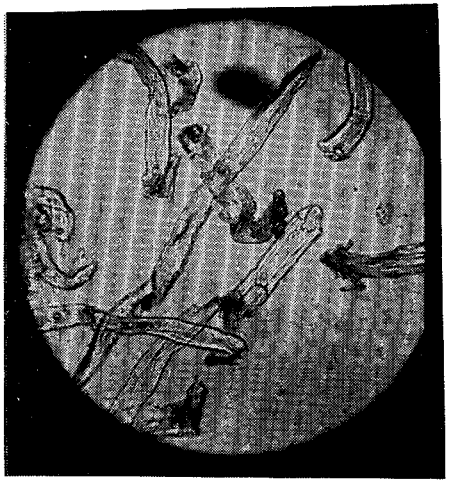
FIG. 1 is a photomicrograph of one typical product of this invention being cellulose fibers encased in a polystyrene casing.

The objects of this invention are accomplished by steeping finely divided, discrete particles in a liquid vinyl monomer, dispersing the absorbate (absorbent particles plus absorbed monomer) in a dispersion medium and polymerizing the monomer.

In the monomer preconditioning process of this invention, the substrate is steeped in an excess of liquid monomer for a substantial period of time and until the substrate has absorbed a desired amount of monomer. In most cases a period of at least fifteen minutes up to 50 hours or longer is desirable. During this period the monomer is absorbed by the substrate. At the end of the steeping period the resultant slurry is filtered to eliminate excess monomer. To the filtered substrate is added an aqueous solution containing catalyst which initiates polymerization, the aqueous solution acting as a dispersion medium. With constant agitation the slurry is heated at the optimum polymerization temperature which for most vinyl monomers is desirably from about 35 to 100° C., and the polymerization at this temperature will normally require from about one half to twelve hours. After the polymerization the product is filtered, washed with water and dried.

The process of the present invention involves the use of an aqueous solution as a dispersion medium which under contoinuous agitation permits a multiplicity of individual discrete reactions to occur at the site of each particle of substrate. The aqueous solution serves the general functions of heat transfer medium, dispersion medium, and, in some cases, serves as the monomer solvent or catalyst solvent. A sufficiently large amount of dispersion medium must be used in order to provide a free flowing slurry of the reactants.

The unique products formed by the process of this invention comprise individual particles of substrate material substantially encased in replicas or beads of vinyl polymer. The polymer may constitute from less than 1% up to 80% of the combined weight of substrate and polymer. Desirably the polymer constitutes between about 5 to 90% by weight. Microscopic examination shows that the substrate is essentially surrounded and encased by the polymer. Each encapsulated particle is distinct and separate from the other particles so encapsulated. The product consists of discrete, free flowing particles. The discrete particle formation prevents bridging between shells during polymer formation and prevents significant agglomeration.

While the present invention is discussed in terms of encapsulating small "particles," it is to be understood that the term is intended to encompass particles, short filaments and fibers of the material. The substrate materials are preferably limited to small particles and fibers. Particles greater than about 30 mesh (U.S. Standard screen size) are usually not suitably encapsulated. Preferably, the particles pass through a 200 mesh screen; such particles are about 74 microns in their largest dimension. Similarly, fibers to be encapsulated are optimally no longer than about 1100 microns and preferably no longer than about 800 microns. Fibers substantially longer than about 1100 microns tend to agglomerate preventing uniform polymer distribution on the fibers, and preventing the formation of a free-flowing, polymer encapsulated product. However, longer fibers, up to about a quarter of an inch in length, may be used by reducing the concentration of the fibers in the dispersion medium in order to avoid agglomeration. That is, when substantially longer fibers are used, greater amounts of the dispersion medium are desirably used with the substrate material than are generally used with shorter fibers.

In the practice of this invention, various particle sizes may be employed, and if it is desired to obtain specific properties, different sizes and shapes may be blended or otherwise employed.

Figure 2:
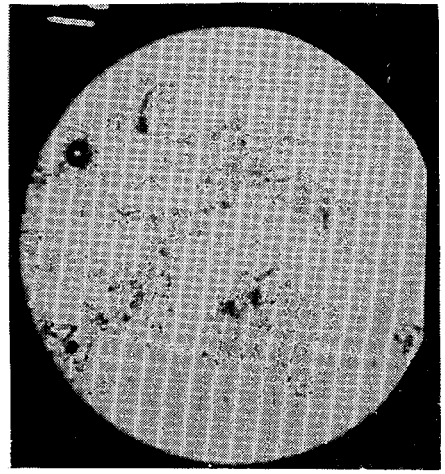
FIG. 2 is a photomicrograph of another typical product of this invention being the product of FIG. 1 after the cellulose substrate was removed.

The two forms which the polymer casing may take may be categorized as beads and replicas. As shown in FIGURE 1, the bead product comprises a large number of small, spheroidal, solid pieces of polymer substantially surrounding each particle of substrate. The bead encased product may be produced with both particles and fibers, each particle or fiber having hundreds of beads surrounding it. The beads do not adhere to each other but rather adhere to the substrate material. If the substrate material is removed, for instance, in the case of cellulose by dissolving it with sulfuric acid, the polymer dissociates into a large number of undifferentiated beads of polymer. Removed from the substrate, the beads are not identifiable as having surrounded a substrate material. That is, the beads do not retain any conformity or configuration related to the shape of the substrate material which they have surrounded, but rather are individual, discrete spheroids of polymer. Such a bead product is shown in FIGURE 2. The bead product may be fabricated or formed into articles under heat and pressure both before and after removal of the substrate.

Figure 3:
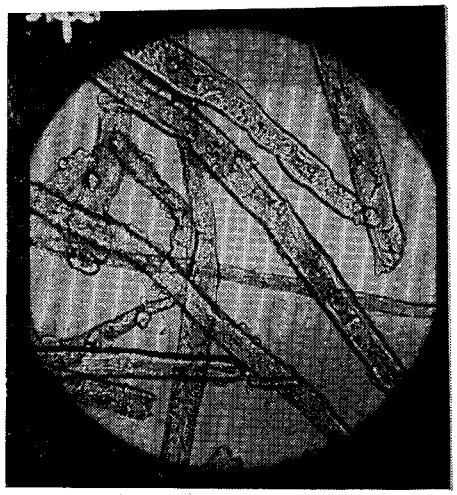
FIG. 3 is a photomicrograph of another typical product of this invention being cellulose fibers encased in a polybutyl methacrylate casing.
Figure 4:
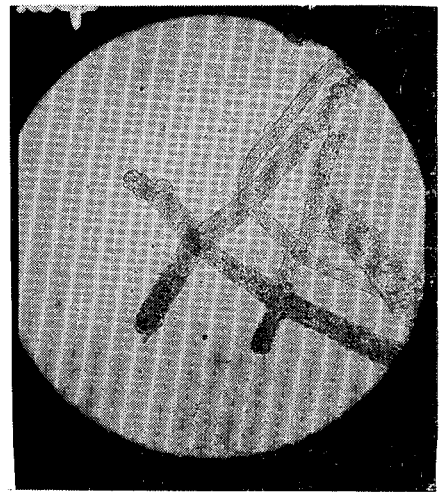
FIG. 4 is a photomicrograph of another typical product of this invention being the product of FIGURE 3 after the cellulose substrate was removed.

The replica form is limited to that formed on a porous fiber substrate. A typical example of this product is illustrated in FIGURE 3. In this product the polymer surrounds the fiber with a continuous film essentially encapsulating the fiber, and pervading openings, channels or lumens within the fiber. Upon removal of the substrate, for instance with cupric ammonia complex or sulfuric acid in the case of cellulose, a negative mold, or replica, of polymer is found to exist. As shown in FIGURE 4, the replica product has a substantially cylindrical exterior and may be considered to be a tube which has portions of its interior filled with polymer in a negative pattern of the substrate fiber on which it was formed. The replica product may be fabricated or formed into articles under heat and pressure both before and after removal of the substrate.

It has been found that where the initial soaking step is carried out with fibers and for a sufficiently long period in order to thoroughly penetrate the substrate fibers, the polymer forms in the shape of replicas of the substrate fibers. Where soaking is carried out for an insufficient period of time, the polymer forms as a plurality of beads essentially surrounding the substrate. It has been found that the time required for thorough penetration varies with individual substrates depending on their physical nature including hardness, capacity to absorb water, etc. Where the fiber is in an unswollen condition, periods as long as seventeen hours or more may be required in order to form replicas. Where the fiber is in a swollen condition or where the surface has been otherwise opened or broken, soaking time may be shorter to produce the polymer replicas. A typical means of opening up the cellulose fiber and producing a more readily swollen fiber is mercerization which comprises a treatment of fibers with dilute caustic for short periods, for instance the treatment of the cellulose fibers with 15% caustic for about one-half hour, followed by dilution and washing.

The initial soaking step is preferably carried out for at least seventeen hours at room temperature using a porous substrate to produce polymer forms in the shape of replicas of the substrate.

The process of this invention is essentially a method for obtaining a locus control polymerization of vinyl monomers on the surfaces of particles in a solvent system. The products are made according to a general principle of locus polymerization which involves so ordering the geometry and chemistry of the reactants that polymers will form in or around the individual substrates with essentially little free polymer being produced apart from the substrate. Due to the substantially continuous agitation the process comprises a large number of individual isolated polymerization reactions, each reaction being independent of every other reaction and occurring at the site of each individual particle. The plurality of individual reactions results in a plurality of individual polymer-encased particles being formed. The locus of each reaction is limited to the substrate material; thus the substrate determines the site of the polymerization. The polymer formed conforms to the shape of the individual substrate particle.

A feature of this invention is that substantially all of the polymer is polymerized or formed on the substrate surface. Although some polymer may permeate into the substrate when a porous substrate is steeped for periods, substantially no polymer is formed apart from the substrate. A further feature of this invention is that the final product is made up of discrete particles, each substantially encased in a capsule of the polymer, there being little agglomeration of the particles through polymer linkage between the shells on two different adjacent substrates.

The dispersed substrate-water-vinyl monomer system utilized in the process of this invention is unique in that it permits polymerization of a vinyl monomer in the absence of any emulsifying or suspending agent. The accepted prior art techniques for polymerizing vinyl monomers in water make use of either emulsification agents or specific suspending agents which effectively control droplet and particle size. The process of this invention is distinguished from the methods most generally used for polymerizing vinyls in that neither an emulsion polymerization technique nor a suspension polymerization technique is involved. It has been found that the use of either emulsifying or suspending agents is harmful to the reaction, resulting in formation of excessive free polymer apart from the substrate and agglomeration of the product.

It has been found that the use of the substrate aids in carrying out the process of this invention. The substrate performs an additional function rather than being merely a site for the deposit of polymer. Without wishing to be bound by a particular theory of operation, it appears that the substrate enables the reaction to continue to completion. For instance, a polymerization reaction carried out without a substrate and without emulsifying or suspending agents resulted in a sticky, low yield, incomplete polymerization reaction. The same experiment carried out in the presence of cellulose fibers went to completion with a good yield and no stickiness.

The discrete substrate vinyl monomer composition utilized in the process of this invention is unique in that it permits polymerization of a substrate-imbibed vinyl monomer instead of being limited to polymerization of droplets of monomer as in the prior art suspension or emulsion type reactions.

The monomers which are useful in the practice of this invention are the monomers containing a vinyl group and their derivatives. The operative monomers include methacrylates, acrylates, styrene, ring-substituted styrenes, vinyl esters, vinyl halides, and acrylonitrile. Monomers useful in the invention include methyl acrylate, ethyl acrylate, n-butyl acrylate, n-amyl acrylate, iso-amyl acrylate, iso-butyl acrylate, n-hexyl acrylate, n-octyl acrylate, cyclo-hexyl acrylate, 2-ethyl hexyl acrylate, methyl methacrylate, ethyl methacrylate, propyl methacrylate, n-butyl methacrylate, iso-butyl methacrylate, n-amyl methacrylate, iso-amyl methacrylate, n-hexyl methacrylate, n-octyl methacrylate, cyclo-hexyl methacrylate, 2-ethyl hexyl methacrylate, p-methyl styrene, vinyl acetate, vinylidene chloride, vinyl fluoride, allyl acetate, 4-chloro-styrene, iso-propenyl acetate, 4-vinyl pyridine, and the like, used either singly or in combination. Vinyl chloride, trifluorochloroethylene, and the like, which are normally gases, may be utilized if liquefied prior to use.

The catalysts which may be used for polymerization are any which will suitably polymerize the vinyl monomer and include bis-cyclopentadienyl titanium dichloride, $[(C_5H_5)_2TiCl_2]$, which is ordinarily used with a cocatalyst, such as d-tartaric acid or trichloroacetic acid, and the so-called free-radical catalysts, which include peroxides, such as benzoyl peroxide; persulfates, such as potassium persulfate and ammonium persulfate; and redox type catalysts, for instance potassium persulfate in combination with sodium bisulfite or ferrous sulfate. The catalyst is desirably used in a range of 0.1 to 2% by weight of monomer. Preferably the catalyst amounts to about 0.5% by weight of the monomer. The catalyst must be soluble in the medium in which it is to be used. The catalyst may be dissolved in the monomer or in the dispersion medium, which may be water or an aqueous solution.

An alternative in the process includes the steps as described above, except that the monomer contains one component of a two component catalyst system, and the water or other dispersing medium contains the second component. In this specific procedure the catalysts used are limited to cyclopentadienyl titanium dichloride and d-tartaric acid or trichloroacetic acid.

Care must be taken to exclude all air from the reaction vessel. Small amounts of oxygen which are left in the reactor may strongly inhibit polymerization and result in lower yields.

It has been found that the method of polymerizing vinyl polymers in the presence of substrates in a dispersion medium is suitable for those substrates which are easily dispersible in the medium and which are easily wettable by the vinyl monomer utilized. Among the substrates useful in the present invention are cellulose, wool, silica, asbestos, carbon black; pigments, extenders and fillers, such as titanium dioxide, calcium carbonate, barium sulfate; and the like. In general, any substrate may be encapsulated which is capable of absorbing the monomer to a reasonable extent.

The minimum amount of dispersion medium that may be used in the practice of this invention is that amount which will just cause the substrate to be free flowing under agitation. The agitation used must be thorough without being destructive to the substrate or the polymer formed thereon. If the agitation is insufficient, the product tends to agglomerate; if the agitation is extremely violent, the polymer tends to separate from the substrate, and long fibers tend to entangle.

The exact mechanism by which the substrates retain the monomer is not fully understood. However, it is possible that where the substrate material consists of small bundles of tubular materials, some of the monomer is retained therein due to capillary action. Where the substrate material is a single particle, it is possible that the monomer is retained thereon due to the affinity of the monomer for the substrate material.

The polymerization temperature is preferably the reflux temperature of the reaction mixture. However, temperatures 15 to 20° C. below the reflux temperature may be used without affecting the reaction. The temperature of the polymerization reaction depends on the specific catalyst and monomer being employed. However, where a poylmer, such as polybutyl methacrylate, is formed which has a tendency to soften at elevated temperatures, care must be taken that the elevated temperatures are not reached during the polymerization reaction. Otherwise, agglomeration may take place between encapsulated substrates due to softening of the polymer.

The glass transition temperature (Tg) of the polymer may be used as a rough guide for the temperature of the polymerization. In general, the polymerization may be carried out at a temperature about 50° C. above the glass transition temperature without sticking or agglomeration of the particles. Without wishing to be bound by any particular theory of operation, it is believed that because of the thinness of the polymer layer on the substrate it is possible to use the temperature above the glass transition temperature to prepare polymer coated substrates having up to 80% by total weight of polymer without agglomeration.

The substrate may be encapsulated with copolymers to obtain particular characteristics. Two or more different monomers may be simultaneously polymerized onto the substrate. The monomers may be selected to impart particular qualities to the finished product. Copolymerization may be used to make the forming or fabrication of the product easier than with homopolymers. For instance, cellulose coated with a copolymer of styrene and ethyl acrylate is more easily formed than one made from styrene alone. As a further example, sheets prepared with cellulose-butyl methacrylate may be stiff; the sheets prepared from cellulose-methyl acrylate are soft and flexible. Intermediate properties are shown by polymers of ethyl methacrylate and copolymers of styrene and ethyl acrylate.

The product consists of discrete, free-flowing particles made up of the substrate substantially encased in a vinyl polymer. The substrate may be removed from the polymer leaving beads or replicas of vinyl polymer. The product may be formed into a self-sustaining article, for instance by placing the product in a mold and forming it under heat and pressure. If desired, the substrate may be removed after the article has been formed; this is particularly advantageous where a porous article is desired. The vinyl polymer after removal of the substrate may also be formed or fabricated into a self-sustaining article. Where the particles are lightly joined to each other by the forming process they are identifiable in the formed article as being made up of substrate substantially encased with vinyl polymer.

The encapsulated product of this invention may be dispersed in water, with wetting agents, etc., if desired, and formed into webs on conventional papermaking machines. Webs so prepared are desirably sintered to form self-sustaining sheets which may be further formed, if desired.

The vinyl polymer encased molding materials may be used to form laminated structures in which the encased particles are fused, pressed or both pressed and fused, about rods, sheets or any desired core material to produce products for many and varied uses. Sheets or other articles made according to the invention can be readily heat sealed or welded to each other or to other heat-sealing materials.

In order more clearly to disclose the nature of the present invention, specific examples of the practice of the invention are hereinafter given. It should be understood, however, that this is done solely by way of example and is intended neither to delineate the scope of the invention nor limit the ambit of the appended claims. Throughout the examples, the sizes of substrate material used are cellulose fibers, Solka Floc, 400 to 700 microns and cellulose fibers, Duralba, 400 to 1300 microns.

All polymer contents are expressed in terms of percent by weight, the weight reference being the total of the substrate weight plus the polymer weight. The yields are expressed as a percent of theoretical yield.

*Example I*

Recipe: Parts by weight
    Cellulose _____ 100
    Styrene _____ 180
    Water _____ 1500
    Benzoyl peroxide: 0.1% based on the styrene concentration.

The 100 parts of cellulose fibers (Solka Floc) were soaked for seventeeen hours in 600 parts of styrene monomer in which 0.6 part of benzoyl peroxide had been dissolved. The resultant product was filtered under vacuum until 180 parts of styrene remained and was then transferred into a three-neck flask mounted with condenser, mechanical stirrer and nitrogen inlet. All 1500 parts of water were added and the mixture heated to 85° C. for five and one-half hours. After polymerization the mixture was filtered, washed first with a mixture of equal parts of water and methanol, then with methanol and dried. The product consisted of 167 parts of cellulose encased with 40% by weight polymer based on total weight. The polymer yield was about 67%. Upon extraction of the cellulose with cupric ammonia complex the polymer was found to be in the form of replicas of the cellulose fibers.

Example II

Recipe: Parts by weight
- Cellulose _____ 50
- Styrene _____ 117
- Water _____ 1500
- Benzoyl peroxide: 0.1% based on the styrene concentration.

The procedure of Example I was repeated except that the ratio of water to substrate was doubled and the styrene monomer concentration increased. The polymerization temperature was 85° C. and the total polymerization time, six hours. The product was similar to that of Example I and after being washed and dried consisted of 126 parts of cellulose encased with about 60.3% polystyrene based on total weight of product. The yield of solid polymer was about 65%.

Example III

Recipe: Parts by weight
- Cellulose _____ 50
- Styrene _____ 117
- Water _____ 1500
- Benzoyl peroxide: 0.1% based on the styrene monomer concentration.

The procedure of Example II was repeated except that long fibers of cellulose (Duralba) were used as the substrate. The polymerization temperature was 85° C. The time of polymerization was four hours. The product was similar to that of Example I and after being washed and dried weighed 76 parts and had a polymer content of about 34%.

Example IV

Recipe: Parts by weight
- Cellulose _____ 150
- Styrene _____ 270
- Water _____ 2000
- d-tartaric acid _____ 0.36
- Cyclopentadienyl titanium dichloride: 0.1% based on the styrene monomer concentration.

The cellulose fiber (Solka Floc) was imbibed with 900 parts of styrene in which 0.9 part of cyclopentadienyl titanium dichloride had been dissolved. The cellulose was permitted to stand in the styrene monomer solution for seventeen hours. The cellulose was filtered under vacuum until 630 parts of styrene was recovered. All 2000 parts of water in which 0.36 part of d-tartaric acid had been previously dissolved were added to the cellulose slurry. The mixture was heated at the polymerization temperature of 86° C. for four hours and fifteen minutes.

The total yield of polystyrene was about 46.15%; the total amount of polystyrene on the cellulose was about 39.7%. The polystyrene had a molecular weight of about 479,000, a softening point of 135–140° C. and a melting point of 174–177° C. When treated with concentrated sulfuric acid, the cellulose was dissolved, but the polystyrene capsule kept the shape of the original fiber. By microscopic examination it was determined that the capsule was a replica of the original fiber.

Sheets made with the encapsulated product, when heated at 320° F., became more stable in concentrated sulfuric acid than the unformed product, and maintained a good porosity for gas. When formed under greater pressures and temperatures, 350° F. and 5,000 p.s.i.g., the sheets became impervious and rigid.

Example V

Recipe: Parts by weight
- Cellulose _____ 20
- Butyl methacrylate _____ 70
- Potassium persulfate _____ 0.5
- Sodium bisulfite _____ 0.05
- Water _____ 350

The 20 parts of cellulose fibers, Solka Floc, were soaked in 150 parts of butylmethacrylate monomer. The cellulose was allowed to stand in butylmethacrylate for seventeen hours. The cellulose was filtered under vacuum until 80 parts of monomer were recovered and then was transferred into a reaction flask. The catalyst components, potassium persulfate and sodium bisulfite, were dissolved in 350 parts of water and added to the cellulose. The resultant slurry was heated to 84° C. under nitrogen with stirring and kept at this temperature for six hours to polymerize the butylmethacrylate monomer. The product after washing and drying weighed 85 parts and consisted of cellulose encased in 76.4% polybutylmethacrylate replica. The polymer yield was 92.8%.

An enlarged photomicrograph of the product is reproduced herein as FIGURE 3. In FIGURE 3 may be seen the polymer coating essentially surrounding the substrate cellulose fibers.

The cellulose was removed with sulfuric acid to from the product illustrated in FIGURE 4. In FIGURE 4 it may be seen that the polymer retains the shape of the substrate fiber. Further examination proved the product to be made up of replicas of the extracted fibers.

Example VI

Recipe: Parts by weight
- Cellulose (Solka Floc) _____ 5
- Styrene _____ 9
- Benzoyl peroxide _____ 0.01
- Water _____ 100

The 5 parts of cellulose were thoroughly mixed with 9 parts of styrene monomer in which 0.01 part of benzoyl peroxide had been dissolved. The product was transferred into a reaction flask and the 100 parts of water added. The mixture was heated to 85° C. to polymerize the styrene monomer. After five and one-half hours reaction the product was filtered, washed with water and methanol and dried. The product weighed 10 parts and consisted of cellulose coated with 50% polystyrene. When the cellulose was extracted from the product with cupric ammonia complex, the polystyrene coating lost the fiber structure and appeared in the form of loose individual beads.

Example VII

Recipe: Parts by weight
- Cellulose _____ 5
- Styrene _____ 20
- Benzoyl peroxide _____ 0.05
- Water _____ 250

The procedure of Example I was repeated except that the ratios of styrene and water to cellulose were increased. The reaction temperature was 86° C. and the reaction time five hours. The product after being filtered, washed with water and methanol and dried was similar to that of Example I and weighed about 18 parts and consisted of cellulose coated with 72.8% polystyrene.

Example VIII

Recipe: Parts by weight
- Cellulose (Duralba) _____ 20
- Styrene _____ 23.5
- Water _____ 450
- Benzoyl peroxide _____ 0.0235

The 0.0235 part of benzoyl peroxide was dissolved in the 23.5 parts of styrene and the solution sprayed on the 20 parts of cellulose with an atomizer. After the addition of the 450 parts of water, the mixture was heated to 85° C. and kept at this temperature for five hours. The product, after being filtered, washed with water and methanol and dried, weighed 25 parts and had a polymer content of 20%. The product consisted of cellulose coated with polystyrene. When the cellulose was extracted from the product, the polystyrene coating lost the fiber structure and appeared in the form of beads.

Example IX

Recipe: Parts by weight

| | |
|---|---|
| Cellulose | 20 |
| Styrene | 40 |
| Water | 450 |
| Biscyclopentadienyl titanium dichloride | 0.04 |
| Tartaric acid | 0.06 |

The procedure of Example VIII was repeated except that the ratio of styrene to cellulose was increased, and a different catalyst was used. The 0.04 part of biscyclopentadienyl titanium dichloride was dissolved in the 40 parts of styrene monomer and the solution sprayed on the 20 parts of cellulose. The 0.06 part of tartaric acid was dissolved in the 450 parts of water and the solution added to the cellulose mixture. The mixture was heated to about 96° C. for 5.5 hours and then filtered. The product after being washed and dried weighed 34 parts and consisted of cellulose coated with 41% polystyrene.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A process for the polymerization of vinyl monomer on a discrete substrate in the form of particles, fibers or filaments comprising:
   (a) steeping said substrate in liquid vinyl monomer for at least 15 minutes; said substrate absorbing said monomer,
   (b) dispersing said substrate in an aqueous medium,
   (c) forming and maintaining under controlled agitation a free-flowing slurry of said dispersed substate,
   (d) maintaining vinyl monomer polymerization catalyst in said slurry,
   (e) polymerizing said monomer at temperatures below the softening temperature of the polymerized monomer; thereby forming vinyl polymer on each individual particle, fiber or filament of said substrate,
   (f) said substrate being selected from the class consisting of cellulose, wool, silica, asbestos, titanium dioxide, calcium carbonate and barium sulfate.
   (g) said vinyl monomer being selected from the class consisting of methacrylic acid esters of straight chain and branched aliphatic alcohols and cycloaliphatic alcohols containing from 1 to 12 carbon atoms, vinyl esters of aliphatic acids containing from 2 to 4 carbon atoms, styrene, ring-substituted styrene containing a methyl or chlorine substituent on said ring, vinyl halides and acrylonitrile,
   (h) said catalyst being soluble in at least one of said monomer said medium and being selected from the class consisting of free radical catalysts and biscyclopentadienyl titanium dichloide, and
   (i) said medium being a non-solvent for said polymer and being selected from the class consisting of water and aqueous solutions.

2. A process as defined in claim 1 wherein said substrate comprises particles smaller than about 30 mesh in size.

3. A process as defined in claim 1 wherein said substrate comprises fibers smaller than about 1100 microns in length.

4. A process as defined in claim 1 wherein said monomer is polymerized to form up to about 80% of polymer based on total weight of said substrate and said polymer.

5. A process as defined in claim 1 wherein said polymerization catalyst are free radical catalysts and said substrate is steeped in said monomer having dissolved therein said free radical catalysts.

6. A process as defined in claim 1 wherein said polymerization catalysts are free radical catalysts an dsaid substrate is dispersed in said medium having dissolved therein said free radical catalysts.

7. A process for the polymerization of vinyl monomer on a discrete substrate in the form of particles, fibers or filaments comprising:
   (a) steeping said substrate in liquid vinyl monomer for a period from at least 15 minutes to a period insufficient for said monomer to substantially penetrate into the interior of said substrate; said substrate absorbing substantially on its outer surface said monomer;
   (b) dispersing said substrate in an aqueous medium,
   (c) forming and maintaining under controlled agitation a free-flowing slurry of said dispersed substrate,
   (d) maintaining vinyl monomer polymerization catalyst in said slurry,
   (e) polymerizing said monomer at temperatures below the softening temperature of the polymerized monomer; thereby forming a plurality of adhering, discrete, essentially spheroids of vinyl polymer substantially surrounding each individual particle, fiber or filament of said substrate,
   (f) said substrate being selected from the class consisting of cellulose, wool, silica, asbestos, titanium dioxide, calcium carbonate and barium sulfate,
   (g) said vinyl monomer being selected from the class consisting of methacrylic acid esters of straight chain and branched aliphatic alcohols and cycloaliphatic alcohols containing from 1 to 12 carbon atoms, vinyl esters of aliphatic acids containing from 2 to 4 carbon atoms, styrene, ring-substituted styrene containing a methyl or chlorine substituent on said ring, vinyl halides and acrylonitrile,
   (h) said catalyst being soluble in at least one of said monomer and said medium and being selected from the class consisting of free radical catalysts and biscyclopentadienyl titanium dichloride, and
   (i) said medium being a non-solvent for said polymer and being selected from the class consisting of water and aqueous solutions.

8. A process for the polymerization of vinyl monomer on a discrete, porous substrate in the form of fibers and fiilaments comprising:
   (a) steeping said substrate in liquid vinyl monomer for a period from at least 15 minutes to a period sufficient for said monomer to penetrate into the porous interior of said substrate; said substrate absorbing said monomer on its outer surface and in its interior,
   (b) dispersing said substrate in an aqueous medium,
   (c) forming and maintaining under controlled agitation a free-flowing slurry of said dispersed substrate,
   (d) maintaining vinyl monomer polymerization catalyst in said slurry,
   (e) polymerizing said monomer at temperatures below the softening temperature of the polymerized monomer; thereby forming a substantially continuous film of vinyl polymer about and extending into the interior of each individual fiber and filament of said substrate,
   (f) said substrate being selected from the class consisting of cellulose and wool,
   (g) said vinyl monomer being selected from the class consisting of methacrylic acid esters of straight chain and branched aliphatic alcohols and cycloaliphatic alcohols containing from 1 to 12 carbon atoms, vinyl esters of aliphatic acids containing from 2 to 4 carbon atoms, styrene, ring-substituted styrene containing a methyl or chlorine substituent on said ring, vinyl halides and acrylonitrile,
   (h) said catalyst being soluble in at least one of said monomer and said medium and being selected from the class consisting of free radical catalysts and biscyclopentadienyl titanium dichloride, and
   (i) said medium being a nonsolvent for said polymer and being selected from the class consisting of water and aqueous solutions.

9. A process for the polymerization of vinyl monomer on a discrete, porous substrate in the form of fibers or fiilaments comprising:
   (a) steeping for at least 17 hours said substarte in liquid vinyl monomer having dissolved therein biscyclopentadienyl titanium dichloride; said substrate absorbing said monomer on its outer surface and in its interior,
   (b) dispersing said substrate in an aqueous medium having dissolved therein a cocatalyst,
   (c) forming and maintaining under controlled agitation a free-flowing slurry of said dispersed substrate,
   (d) polymerizing said monomer at temperatures below the softening temperature of the polymerized monomer; thereby forming a substantially continuous film of vinyl polymer about and extending into the interior of each individual fiber or filament of said substrate,
   (e) said substrate being selected from the class consisting of cellulose and wool,
   (f) said vinyl monomer being selected from the class consisting of methacrylic acid esters of straight chain and branched aliphatic alcohols and cycloaliphatic alcohols containing from 1 to 12 carbon atoms, vinyl esters of aliphatic acids containing from 2 to 4 carbon atoms, styrene, ring-substituted styrene containing a methyl or chlorine substituent on said ring, vinyl halides and acrylonitrile,
   (g) said cocatalyst being seltcted from the class consisting of d-tartaric acid and trichloroacetic acid, and
   (h) said medium being a non-solvent for said polymer and being selected from the class consisting of water and aqueous solutions.

References Cited by the Examiner

UNITED STATES PATENTS

| | | | |
|---|---|---|---|
| 1,974,064 | 9/1934 | Ford | 260—3 |
| 2,171,765 | 9/1939 | Rohm et al. | 260—41 X |
| 2,744,291 | 5/1956 | Stastny et al. | 260—2.5 |
| 2,767,159 | 10/1956 | Potts et al. | 260—431 X |
| 2,797,201 | 6/1957 | Ceatch et al. | 260—2.5 |
| 3,121,698 | 2/1964 | Orsino et al. | 260—2.5 |
| 3,138,478 | 6/1964 | Hedman et al. | 260—2.5 X |

FOREIGN PATENTS

| | | |
|---|---|---|
| 858,930 | 1/1961 | Great Britain. |
| 37–3300 | 1/1961 | Japan. |

WILLIAM H. SHORT, *Primary Examiner.*

LOUISE P. QUAST, *Examiner.*

E. M. WOODBERRY, *Assistant Examiner.*